United States Patent
Tan et al.

(10) Patent No.: US 9,199,738 B2
(45) Date of Patent: Dec. 1, 2015

(54) MOUNTING SYSTEM FOR ATTACHING A BOX IN A COMPARTMENT OF AN AIRCRAFT GALLEY

(75) Inventors: Joyce Tan, Gilching (DE); Iwan Pangalila, Hamburg (DE); Robert Henshaw, Newnan, GA (US)

(73) Assignee: Airbus Operations GmbH, Hamburg (DE)

( * ) Notice: Subject to any disclaimer, the term of this patent is extended or adjusted under 35 U.S.C. 154(b) by 1061 days.

(21) Appl. No.: 13/140,772

(22) PCT Filed: Nov. 23, 2009

(86) PCT No.: PCT/EP2009/008327
§ 371 (c)(1),
(2), (4) Date: Sep. 26, 2011

(87) PCT Pub. No.: WO2010/078885
PCT Pub. Date: Jul. 15, 2010

(65) Prior Publication Data
US 2012/0006941 A1  Jan. 12, 2012

Related U.S. Application Data

(60) Provisional application No. 61/203,224, filed on Dec. 19, 2008.

(30) Foreign Application Priority Data

Dec. 19, 2008  (DE) .......................... 10 2008 064 084

(51) Int. Cl.
*E05B 65/46* (2006.01)
*B64D 11/04* (2006.01)

(52) U.S. Cl.
CPC . *B64D 11/04* (2013.01); *Y02T 50/46* (2013.01)

(58) Field of Classification Search
USPC ...................... 244/118.5; 312/215, 9.11–9.37
See application file for complete search history.

(56) References Cited

U.S. PATENT DOCUMENTS 1,378,285 A * 5/1921 Schwartz ...................... 312/221
1,774,236 A * 8/1930 Ohnstrand .................... 312/286

(Continued)

FOREIGN PATENT DOCUMENTS

DE           1035331 B     7/1958
DE           10224542 A1   2/2003

(Continued)

OTHER PUBLICATIONS

International Search Report and Written Opinion, PCT/EP2009/008327, International Search Authority/DE, Airbus Deutschland GmbH, Jul. 20, 2010.
English language translation of the Written Opinion for PCT/EP2009/008326, Jun. 21, 2011.
English language abstract of DE 10224542 A1, Feb. 27, 2003.

*Primary Examiner* — Matthew Ing
*Assistant Examiner* — Timothy M Ayres
(74) *Attorney, Agent, or Firm* — Taft Stettinius & Hollister LLP

(57) ABSTRACT

A mounting system (10) for attaching a box (14) in a compartment (12) of an aircraft galley comprises a first guide device set up for engaging with a complementary second guide device designed on the box (14) when the box (14) is inserted into the compartment (12) of the aircraft galley, and further set up for securing the box (14) against movement in the compartment (12) of the aircraft galley in a direction (P) perpendicular to a longitudinal axis (L) of the compartment (12) of the aircraft galley when the device is engaged with the complementary second guide device designed on the box (14). The mounting system (10) further comprises a locking mechanism set up for securing the box (14) against movement in the compartment (12) of the aircraft galley in a direction parallel to the longitudinal axis (L) of the compartment (12) of the aircraft galley.

14 Claims, 7 Drawing Sheets

(56) References Cited

U.S. PATENT DOCUMENTS

Figure 1:
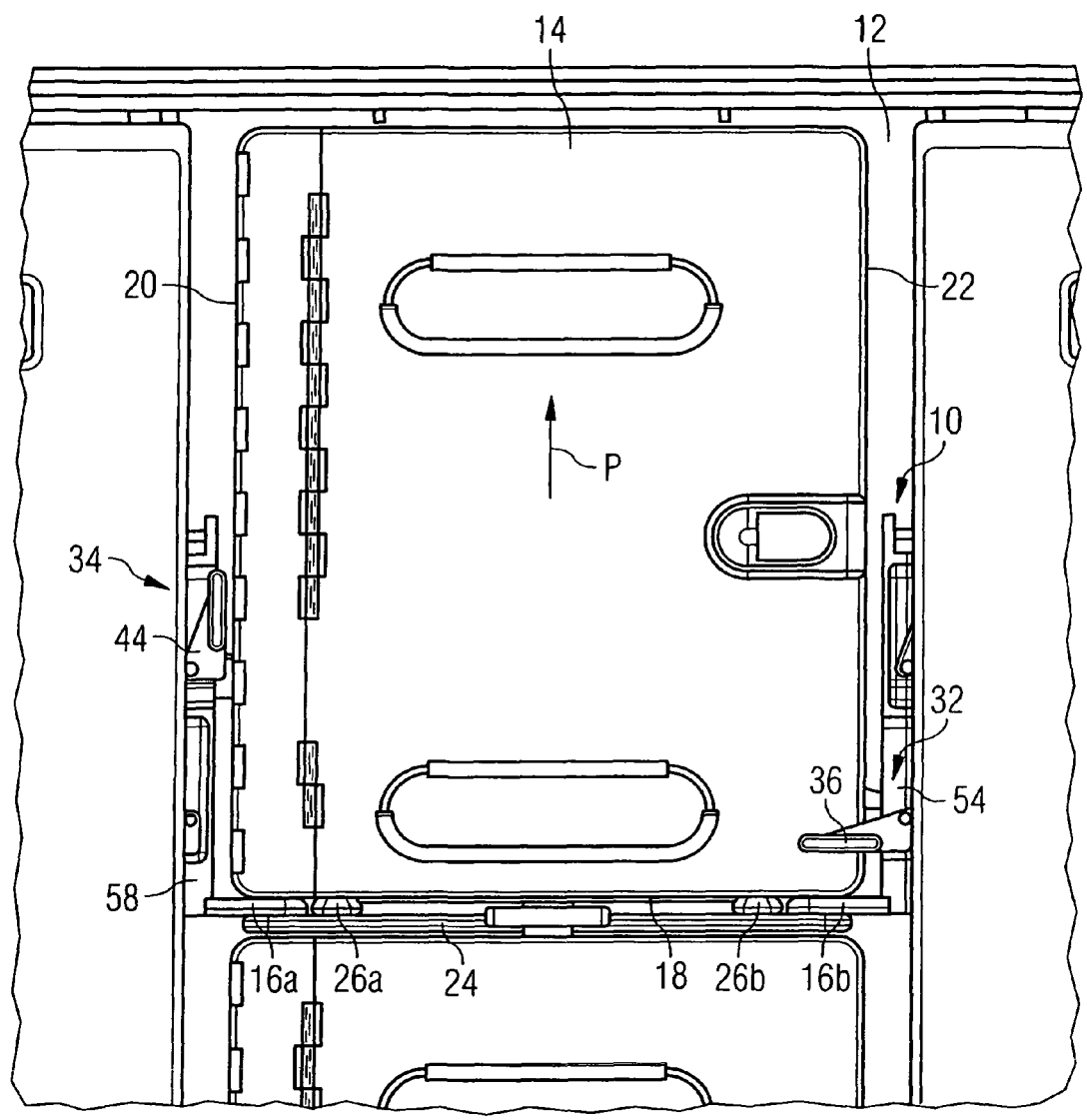

| | | | |
|---|---|---|---|
| 3,059,986 A * | 10/1962 | Miller, Jr. | 312/334.8 |
| 3,232,687 A | 2/1966 | Mulreed | |
| 3,467,251 A * | 9/1969 | Janss et al. | 206/456 |
| 4,057,306 A * | 11/1977 | Resch, Jr. | 312/218 |
| 4,890,938 A | 1/1990 | Allen et al. | |
| 2003/0184197 A1 | 10/2003 | Lai | |
| 2003/0205953 A1 * | 11/2003 | Fox | 312/216 |
| 2006/0091767 A1 * | 5/2006 | Chaloner et al. | 312/223.2 |
| 2008/0001031 A1 | 1/2008 | Doebertin et al. | |

FOREIGN PATENT DOCUMENTS

| | | |
|---|---|---|
| DE | 102006023047 A1 | 11/2007 |
| FR | 1333572 A | 6/1963 |
| WO | WO 2007/095000 A2 | 8/2007 |
| WO | WO 2008/067428 A1 | 6/2008 |

* cited by examiner

MOUNTING SYSTEM FOR ATTACHING A BOX IN A COMPARTMENT OF AN AIRCRAFT GALLEY

CROSS REFERECE TO RELATED APPLICATIONS

The present application is a §371 national stage patent application of PCT/EP2009/008327, filed Nov. 23, 2009, claiming priority to German Patent Application No. 10 2008 064 084.0 and U.S. Provisional Patent Application No. 61/203,224, both filed Dec. 19, 2008, which are incorporated herein by reference.

The present invention relates to a mounting system for attaching a box in a compartment of an aircraft galley provided for receiving the box. The invention further relates to an aircraft galley that is equipped with such a mounting system.

From WO 2007/095000 A1 an aircraft galley of a modular construction is known, which comprises a basic body with a plurality of compartments. In the compartments of the basic body various appliances, such as for example an oven or a microwave, are disposed. Further accommodated in the compartments of the basic body is a plurality of boxes, which are disposed one behind the other and in which service products, such as for example food or drinks, for supplying to the passengers on board the aircraft may be stowed.

The underlying object of the invention is to provide a mounting system that enables a box, which is used for example to accommodate service products required for supplying to the passengers on board the aircraft, to be securely attached in a compartment of an aircraft galley that is provided for receiving the box.

To achieve this object, a mounting system according to the invention for attaching a box in a compartment of an aircraft galley provided for receiving the box comprises a first guide device set up for engaging with a complementary second guide device formed on the box when the box is inserted into the compartment of the aircraft galley provided for receiving the box. When the first guide device of the mounting system according to the invention is engaged with the complementary second guide device formed on the box, the box is secured against movement in the compartment of the aircraft galley in a direction perpendicular to a longitudinal axis of the compartment of the aircraft galley. Here, by a longitudinal axis of the compartment of the aircraft galley is meant an axis that extends from front to back of the compartment, i.e. in the direction of the depth of the compartment, through the compartment of the aircraft galley. The interaction of the first and the second guide device therefore prevents the box from movement in an undesirable manner in the compartment of the aircraft galley for example during the ascent or the descent of the aircraft as well as in turbulent conditions. The compartment therefore need not necessarily be provided with side walls and/or a top cover to prevent an undesirable movement of the box. An aircraft galley provided with the mounting system according to the invention may therefore, if need be, be of a particularly lightweight design.

The mounting system according to the invention further comprises a locking mechanism set up for securing the box against movement in the compartment of the aircraft galley in a direction parallel to the longitudinal axis of the compartment of the aircraft galley. In other words, the locking mechanism is used to prevent the box from accidentally falling out of the compartment of the aircraft galley. If the compartment of the aircraft galley provided for receiving the box is provided with a door, the locking mechanism enables a redundant safeguarding of the box against movement parallel to the longitudinal axis of the compartment. Where desired or necessary, it is however possible, by equipping the mounting system according to the invention with a locking mechanism, also to dispense with the provision of an additional door for a compartment, provided for receiving a box, of an aircraft galley equipped with the mounting system according to the invention because the locking mechanism already reliably prevents the box from falling out of the compartment of the aircraft galley. This in turn makes it possible to reduce the weight of an aircraft galley equipped with the mounting system according to the invention.

Preferably the first guide device is disposed on a carrier element that is devised to support a base element of the box when the first guide device is in engagement with the complementary second guide device formed on the box. The carrier element may be so designed that it forms a base element of the compartment of the aircraft galley provided for receiving the box. Preferably, however, the carrier element extends only over part of the surface area that a base element of the aircraft galley compartment would occupy. For example, the carrier element may be configured in the form of two strips, which run parallel to one another and parallel to the longitudinal axis of the aircraft galley compartment and support edge regions of the base element of the box that adjoin side elements of the box. Given such a particularly lightweight development of the mounting system according to the invention, the first guide device is preferably also of a multi-part construction, i.e. each of the strips forming the carrier element is provided with a corresponding part of the first guide device. If the first guide device is of a multi-part design, the second guide device is also preferably of a corresponding multi-part design.

The first guide device may for example comprise a rail that is provided for interacting with a component, which is of a complementary design to the shape of the rail, of the second guide device formed on the box. Alternatively the second guide device formed on the box may comprise a rail that is devised to interact with a component of the first guide device that is of a complementary design to the shape of the rail. A particularly secure connection of the first guide device to the second guide device may be guaranteed if the first guide device and the complementary second guide device formed on the box form a dovetail joint. For example, the first guide device may comprise a rail that is shaped in such a way that it is capable of receiving a dovetail extension formed on the box. Alternatively, the second guide device formed on the box may comprise a rail that is shaped in such a way that it is capable of receiving a dovetail extension fastened for example to the carrier element.

In a preferred embodiment of the mounting system according to the invention, the locking mechanism comprises a first locking unit having a first number of bars. The bars of the first locking unit are preferably devised in a locking position to secure a number, corresponding to the first number of bars, of boxes accommodated one behind the other in the compartment of the aircraft galley against movement in the compartment of the aircraft galley in a direction parallel to the longitudinal axis of the compartment of the aircraft galley. For example, the first locking unit may comprise two bars. The locking unit is then capable of securing two boxes accommodated one behind the other in the compartment of the aircraft galley against an undesirable movement. By virtue of equipping the first locking unit with a first number of bars that corresponds to the number of boxes to be accommodated one behind the other in the compartment of the aircraft galley, each of the boxes accommodated in the aircraft galley compartment may be secured separately, i.e. by means of a bar exclusively associated with it. This prevents the boxes in the aircraft galley compartment from movement relative to one another for example during the ascent or the descent of the aircraft or in turbulent conditions.

The first locking unit may comprise a coupling device, which couples the bars of the first locking unit in such a way to one another that upon a movement of a first bar of the first locking unit into a locking position the remaining bars of the first locking unit are likewise moved into a locking position, and that upon a movement of the first bar of the first locking unit into an unlocking position the remaining bars of the first locking unit are likewise moved into an unlocking position. By means of the coupling device of the first locking unit it is therefore possible, by actuating a first bar that is disposed for example in an easily accessible front region of the aircraft galley compartment, also to actuate bars that are disposed in a poorly accessible or inaccessible rear region of the aircraft galley compartment. The coupling device may comprise for example a rod that is rotatable about its longitudinal axis and that carries the bars of the first locking unit.

The locking mechanism of the mounting system according to the invention may further comprise a second locking unit having a second number of bars. The second number of bars of the second locking unit preferably differs from the first number of bars of the first locking unit. The bars of the second locking unit are preferably devised in a locking position to secure a number, corresponding to the second number of bars, of boxes accommodated one behind the other in the compartment of the aircraft galley against movement in the compartment of the aircraft galley in a direction parallel to the longitudinal axis of the compartment of the aircraft galley. For example, the second locking unit may be equipped with three bars and hence separately secure three boxes accommodated one behind the other in the aircraft galley compartment against accidental movement.

If the locking mechanism of the mounting system according to the invention comprises a first and a second locking unit having a differing number of bars, the mounting system according to the invention is particularly versatile because, depending on requirements, a different number of boxes accommodated in the aircraft galley compartment may be separately secured either by means of the first or by means of the second locking unit against an undesirable movement in the aircraft galley compartment. Where it is desired or necessary to secure boxes of differing size against undesirable movement in an aircraft galley compartment, the locking mechanism of the mounting system according to the invention may also be equipped with more than two locking units having a differing number of bars. The mounting system may therefore, by virtue of an appropriate design of the locking mechanism, be adapted particularly flexibly to specific application requirements.

The first locking unit of the mounting system according to the invention may comprise a blocking mechanism and be movable between a first and a second position. In the first position of the first locking unit the blocking mechanism preferably enables a movement of a bar of the first locking mechanism into a locking position. In the second position of the first locking unit, on the other hand, a movement of the bar of the first locking unit is preferably blocked by the blocking mechanism. Alternatively or in addition thereto, the second locking unit may comprise a blocking mechanism and be movable between a first and a second position. In the first position of the second locking unit the blocking mechanism may enable a movement of a bar of the second locking unit into a locking position. In the second position of the second locking unit, on the other hand, the blocking mechanism may block a movement of the bar of the second locking unit into a locking position. Thus, by means of the blocking mechanism an accidental movement of a bar of the first and/or the second locking unit into a locking position may be prevented.

The blocking mechanism of the first locking unit may comprise at least one blocking projection, which in the second position of the first locking unit interacts in such a way with a bar of the first locking unit that a movement of the bar into a locking position is blocked. In the first position of the first locking unit, on the other hand, the blocking projection upon a movement of the bar into a locking position may be received in a recess formed in the bar so that it does not impede the movement of the bar. If the first locking unit comprises a coupling device for coupling the bars of the first locking unit, it is in principle sufficient to secure only one bar of the locking unit by means of a blocking mechanism against an undesirable movement in its locking position. Preferably, however, there is associated with each bar of the first locking unit a corresponding blocking projection, which in the second position of the first locking unit blocks a movement of the bars of the first locking unit into their locking position. In a corresponding manner, preferably each bar of the first locking unit is provided with a recess, which is shaped and disposed in such a way that in the first position of the first locking unit, upon a movement of the bar into the locking position thereof, it receives a blocking projection of the blocking mechanism that is associated with the bar.

Each blocking projection of the blocking mechanism may be disposed for example in a housing, which at least partially accommodates a bar of the first locking unit that is associated with the blocking projection. The first locking unit is preferably movable between its first and its second position relative to the housings that at least partially accommodate the bars of the first locking unit.

In a similar fashion the blocking mechanism of the second locking unit may comprise at least one blocking projection, which in the second position of the second locking unit interacts in such a way with a bar of the second locking unit that a movement of the bar into a locking position is blocked and which in the first position of the second locking unit upon a movement of the bar into a locking position is received in a recess formed in the bar. If the second locking unit comprises a coupling device for coupling the bars of the second locking unit, it may be sufficient to secure only one bar of the second locking unit by means of a blocking mechanism against an accidental movement into its locking position. Preferably, however, the blocking mechanism of the second locking unit comprises a number of blocking projections that corresponds to the number of bars of the second locking unit, so that with each bar of the second locking unit a corresponding blocking projection is associated. In a corresponding manner, preferably all of the bars of the second locking unit are provided with a recess, which is shaped and disposed in such a way that in the first position of the second locking unit it receives a blocking projection of the blocking mechanism that is associated with the bar.

A blocking projection of the blocking mechanism of the second locking unit may be disposed for example in a housing, which at least partially accommodates a bar of the second locking unit. In a similar manner to the first locking unit, the second locking unit is also preferably movable between its first and its second position relative to the housings that at least partially accommodate the bars of the second locking unit.

In a preferred embodiment of the mounting system according to the invention the first and the second locking unit are connected to one another by a transmission. The transmission is preferably devised to move the second locking unit into its second position, in which the blocking mechanism of the second locking unit blocks a movement of a bar of the second locking unit into a locking position, when the first locking unit is moved into its first position, in which the blocking mechanism of the first locking unit enables a movement of a bar of the first locking unit into a locking position. The transmission may further be devised to move the first locking unit into its second position, in which the blocking mechanism of the first locking unit blocks a movement of a bar of the first locking unit into a locking position, when the second locking unit is moved into its first position, in which the blocking mechanism of the second locking unit enables a movement of a bar of the second locking unit into a locking position. The transmission therefore ensures that the bars of the second locking unit are automatically blocked in their unlocking position when the bars of the first locking unit are movable into their locking position. Conversely, the transmission ensures that the bars of the first locking unit are blocked in their unlocking position when the bars of the second locking unit are movable into their locking position.

The transmission may comprise a lever, which is pivotable about a centre line and is connected at a first end to the first locking unit and at a second end to the second locking unit. Thus, a linear movement of the first locking unit in a first direction, which gives rise to a movement of the first end of the lever in the first direction, is converted by the lever and/or the second end of the lever, which moves in a second, opposite direction to the first direction, to a linear movement of the second locking unit in the second, opposite direction to the first direction.

The mounting system according to the invention may further comprise a detection device for detecting the size of a box accommodated in the compartment of the aircraft galley. The detection device may be an optical detection device or a mechanical detection device. For example, the detection device may be devised to detect a mark provided on the box or to interact mechanically with such a mark. The mounting system according to the invention may moreover comprise an actuating device, which is devised in dependence upon the size, detected by the detection device, of the box accommodated in the compartment of the aircraft galley to move either the first or the second locking unit into its first position, in which the blocking mechanism of the first or the second locking unit enables a movement of a bar of the first or the second locking unit into a locking position. In other words, the actuating unit ensures that in dependence upon the size, detected by the detection device, of the box accommodated in the compartment of the aircraft galley the appropriate locking unit for locking this box is automatically activated for locking purposes.

The mounting system according to the invention preferably further comprises an unloading device comprising an actuating handle as well as a slider, which is connected to the actuating handle and displaceable parallel to the longitudinal axis of the compartment of the aircraft galley. The slider is preferably devised to interact with a rear wall of a box accommodated in the compartment of the aircraft galley in order, upon an actuation of the actuating handle, to slide the box out of the compartment of the aircraft galley. The unloading device therefore makes it possible comfortably to remove from the aircraft galley compartment boxes that are disposed in a rear region of the aircraft galley compartment. Equipping the mounting system according to the invention with an unloading device is particularly advantageous if the mounting system is to be fitted in an aircraft galley compartment that is disposed at a relatively great height.

The unloading device may comprise a spring that opposes an actuation of the actuating handle and hence a displacement of the slider in a direction parallel to the longitudinal axis of the compartment of the aircraft galley. This minimizes the risk of unintentional actuation of the actuating handle.

An aircraft galley according to the invention comprises a basic body, in which at least one compartment for receiving a box is formed, as well as a mounting system according to the invention as described above.

Figure 2:
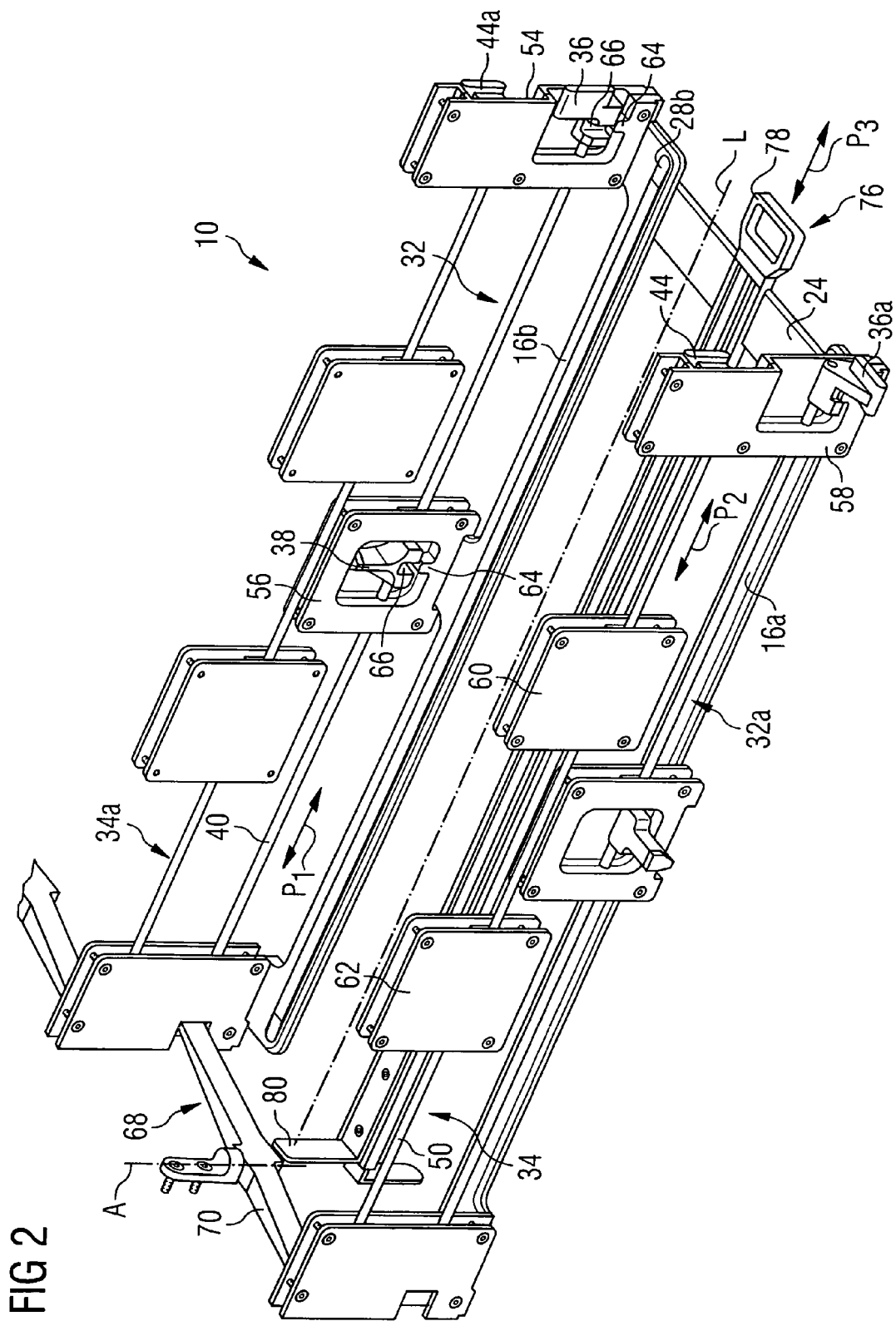
Figure 3:
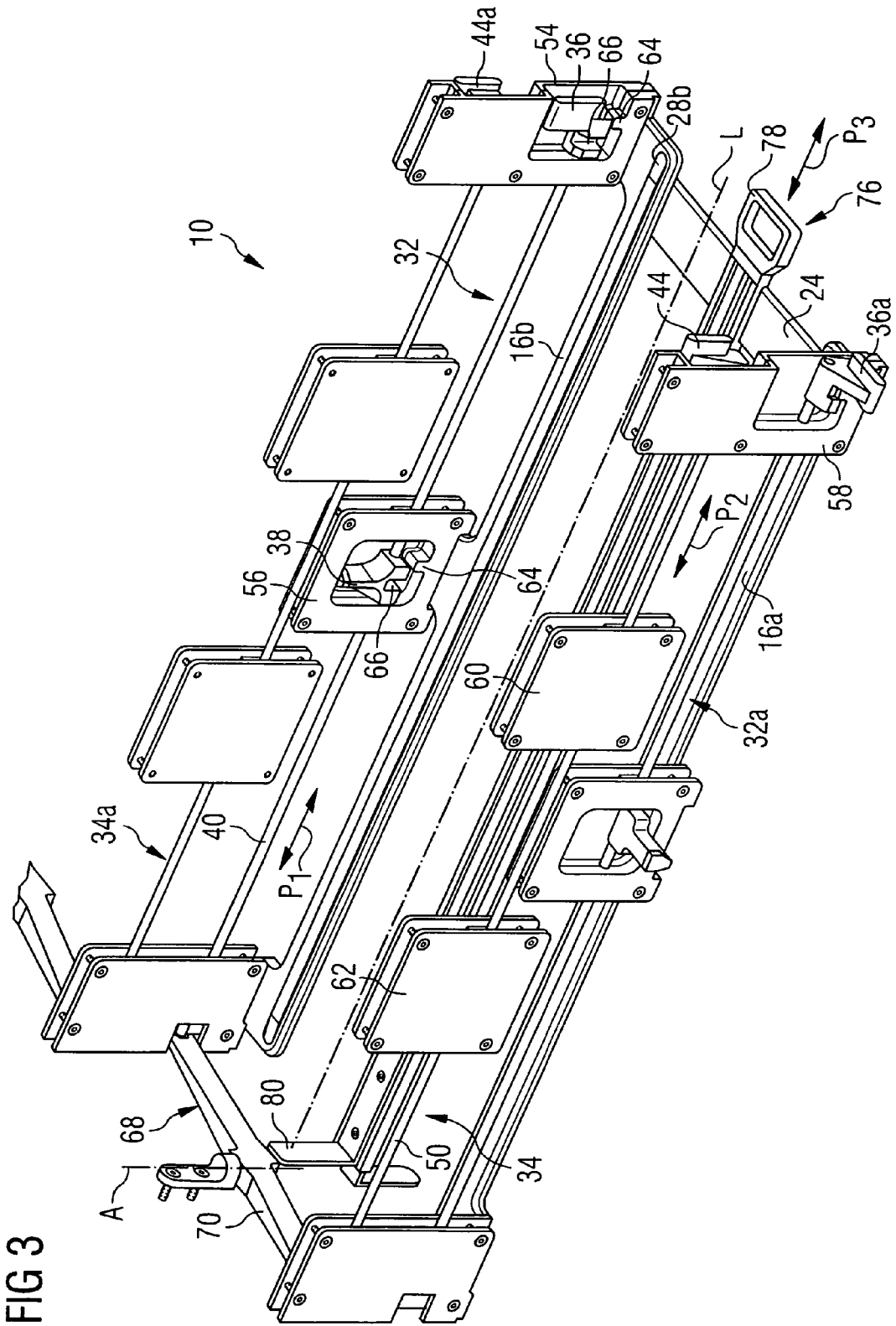
Figure 4:
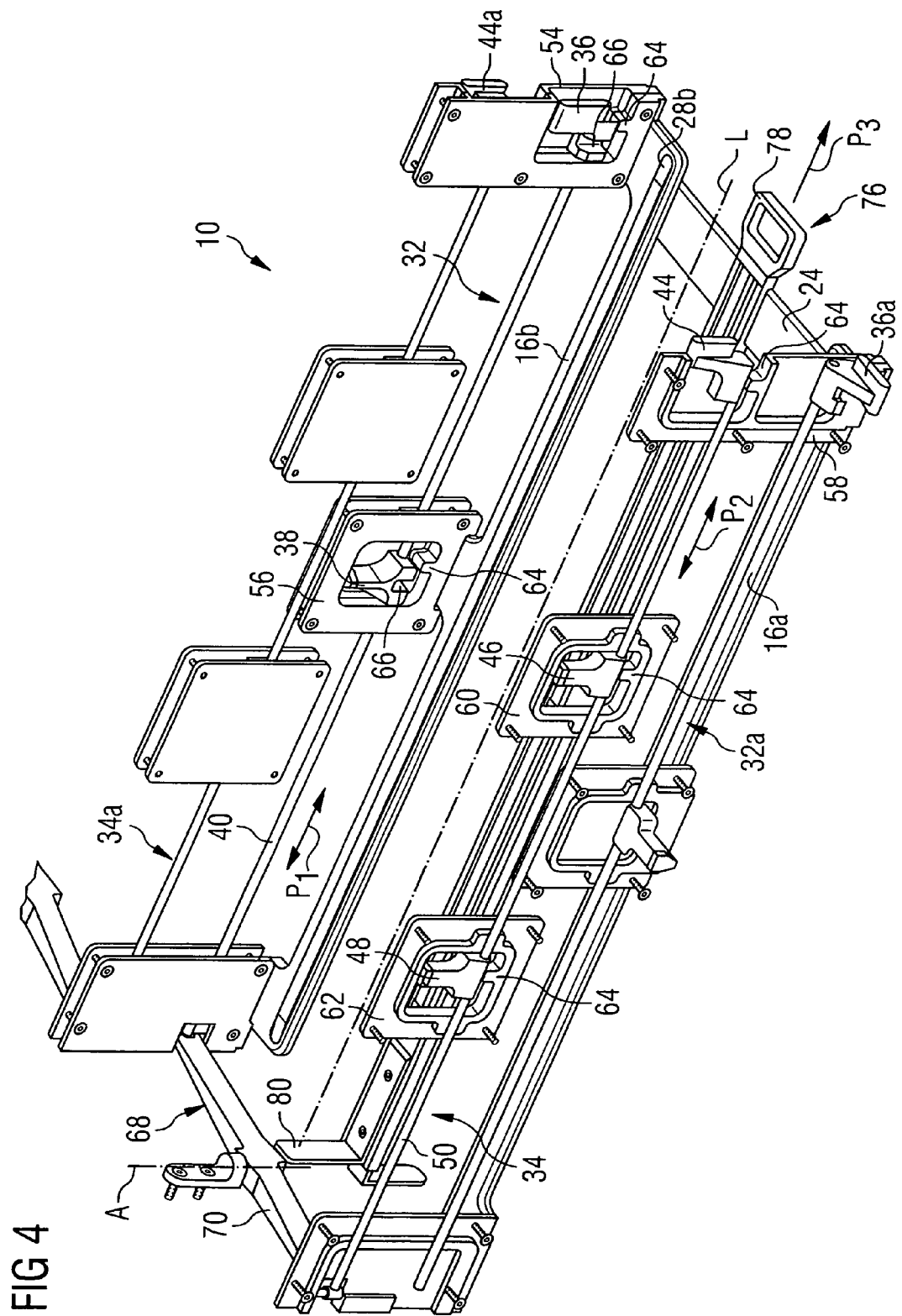
Figure 5:
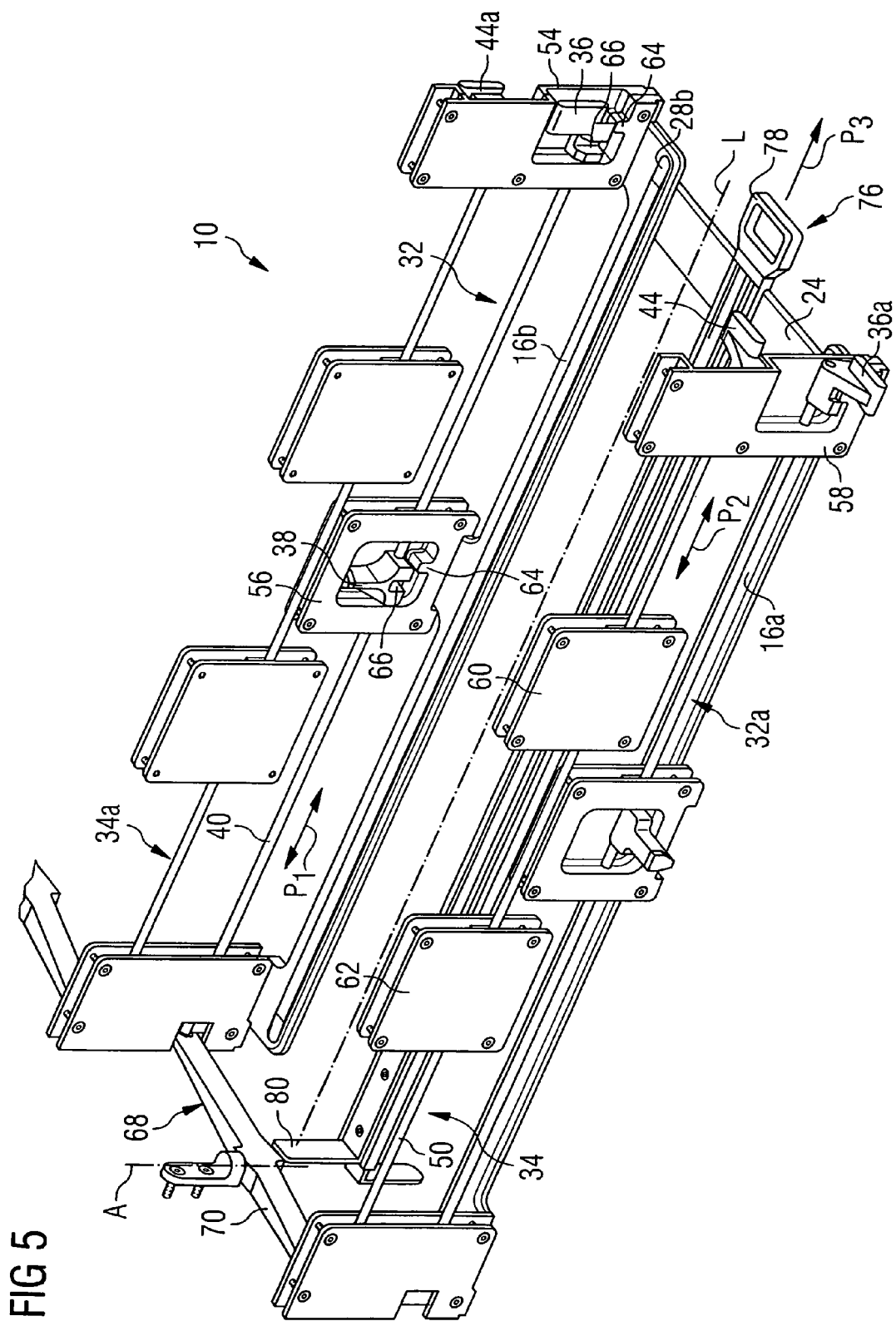
Figure 6:
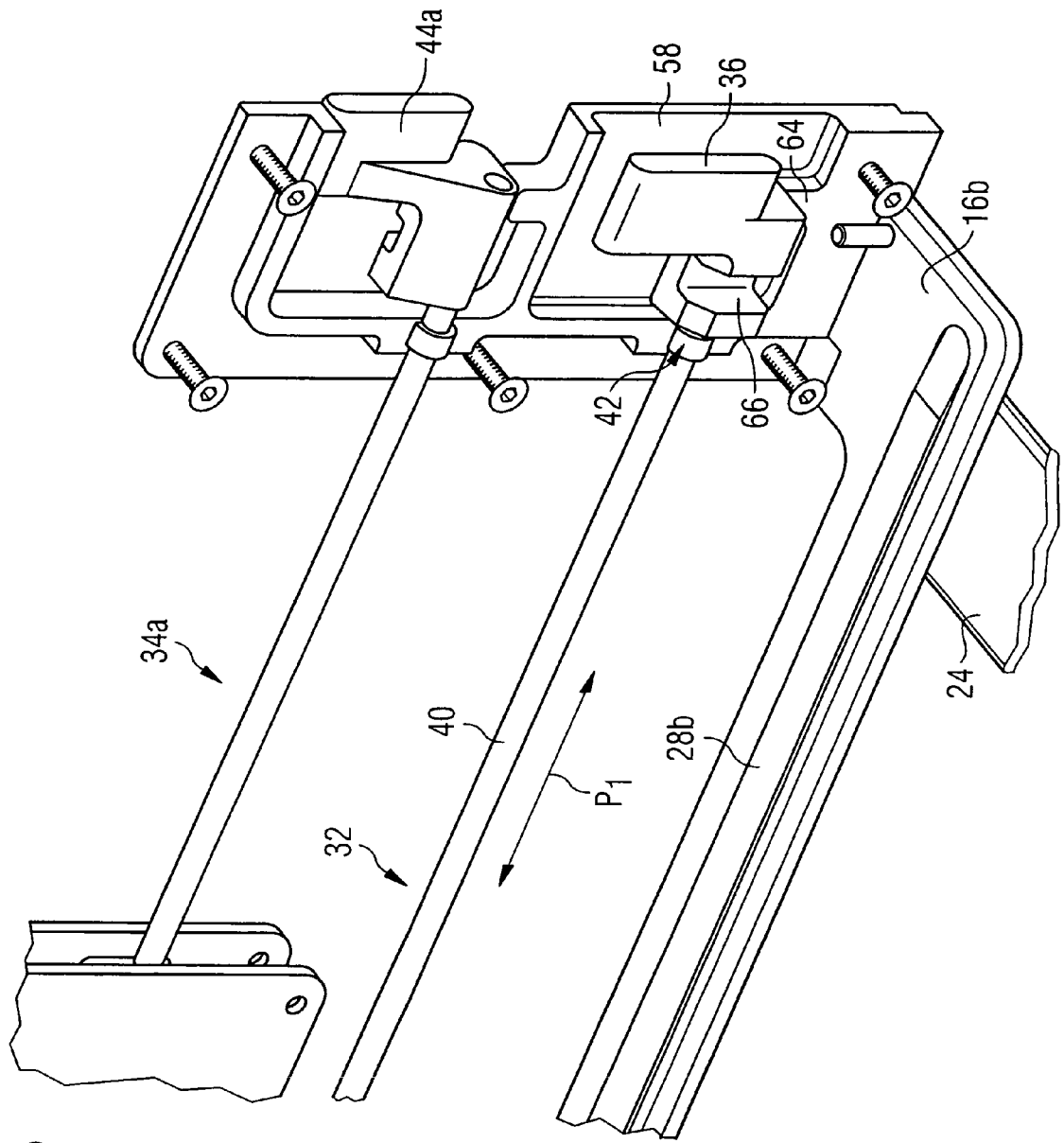

A preferred embodiment of the mounting system according to the invention for attaching a box in a compartment of an aircraft galley that is provided for receiving the box is described in detail below with reference to the accompanying diagrammatic drawings, which show FIG. 1 an aircraft galley compartment, in which a box is attached by means of a mounting system, FIG. 2 a mounting system for attaching a box in a compartment of an aircraft galley, in which a first locking unit of a locking mechanism is in a first position, in which bars of the first locking unit may be moved into a locking position, while a second locking unit of the locking mechanism is in a second position, in which bars of the second locking unit are blocked in an unlocking position, FIG. 3 a mounting system according to FIG. 2, wherein however the second locking unit is now in a first position, in which the bars of the second locking unit may be moved into a locking position, while the first locking unit is in a second position, in which the bars of the first locking unit are blocked in an unlocking position, FIG. 4 the mounting system according to FIG. 3, wherein for illustrative purposes housings that accommodate the bars of the second locking unit are represented in a partially open state, FIG. 5 a mounting system according to FIG. 2, wherein however the bars of the second locking unit are now in a locking position, while the first locking unit is in a second position, in which the bars of the first locking unit are blocked in an unlocking position, FIG. 6 an enlarged representation of a first bar of the first locking unit, which, as represented in FIGS. 3 to 5, is in a second position, in which a movement of the first bar into a locking position is blocked, and FIG. 7 a cross-sectional view of a detail of a mounting system according to FIGS. 1 to 6 that illustrates the design of a first and a second guide device.

A mounting system 10 shown in the figures is used to attach a box 14, which is provided for accommodation in a compartment 12 of an aircraft galley, in the compartment 12 of the aircraft galley (see FIG. 1). The box 14 may contain for example service products, such as for example food or drinks, for supplying to the passengers on board the aircraft. The mounting system 10 comprises two strip-shaped carrier elements 16*a*, 16*b*, which extend parallel to one another and are used to support portions of a base plate 18 of the box 14 that are adjacent to side walls 20, 22 of the box 14. The carrier elements 16*a*, 16*b* are connected to one another by a support strut 24. Feet 26*a*, 26*b* of the box 14 that are fastened to the base plate 18 of the box 14 may be supported on the support strut 24. By virtue of this development of the mounting system 10 it is possible to dispense with providing the compartment 12 of the aircraft galley with a base plate.

Disposed on the carrier elements 16*a*, 16*b* is a first guide device, which comprises two rails 28*a*, 28*b* that are formed in the carrier elements 16*a*, 16*b*. The rails 28*a*, 28*b* of the first guide device are devised to interact with a complementary second guide device that is formed on the box 14. As is evident in particular from FIG. 7, the second guide device comprises two projections 30a, 30b, which extend from the base plate 18 of the box 14 and are shaped and disposed in such a way that they come into engagement with the rails 28a, 28b of the first guide device when the box is inserted into the aircraft galley compartment 12 that is equipped with the mounting system 10.

Figure 7:
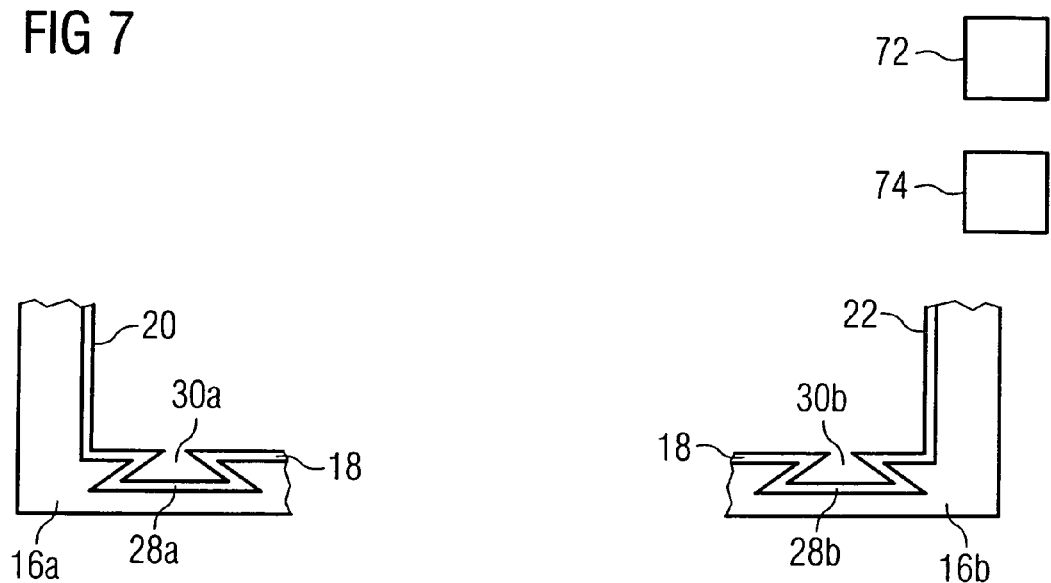

The rails 28a, 28b of the first guide device and the projections 30a, 30b of the second guide device form a dovetail joint that secures the box 14 against displacement in the compartment 12 of the aircraft galley in a direction, represented by the arrow P in FIG. 7, perpendicular to a longitudinal axis L of the compartment 12 of the aircraft galley. The box 14 is therefore prevented from movement undesirably in the compartment 12 of the aircraft galley during the ascent and the descent of the aircraft and in turbulent conditions.

The mounting system further comprises a locking mechanism, which comprises a first locking unit 32 and a second locking unit 34. The first locking unit 32 comprises a first and a second bar 36, 38, which are connected to one another by a coupling device. The coupling device comprises a rod 40, which carries the bars 36, 38 and is mounted rotatably in bearings 42 (see FIG. 6) made of a plastics material. A pivoting movement of the first bar 36 of the first locking unit 32 from an unlocking position shown in FIGS. 2 to 6 into a locking position is therefore transmitted by the rod 40 of the coupling device to the second bar 38 of the first locking unit 32. The second bar 38 of the first locking unit 32 is therefore always pivoted in a manner corresponding to the first bar 36 of the first locking unit 32 from its unlocking position into its locking position or from its locking position into its unlocking position.

With the aid of the first locking unit 32 two boxes 14 disposed one behind the other in the compartment 12 of the aircraft galley may be secured against displacement in the compartment 12 of the aircraft galley in a direction parallel to the longitudinal axis L of the compartment 12 of the aircraft galley. It is moreover naturally also possible with the aid of the first locking unit 32 to fix only one box 14, which occupies approximately half the depth of the compartment 12 of the aircraft galley, in the compartment 12 of the aircraft galley. The box 14 may then be either disposed in a rear region of the compartment 12 and secured by means of the second bar 36 of the first locking unit 32 or disposed in a front region of the compartment 12 and secured at the front and rear by both bars 36, 38 of the first locking unit 32.

As is evident in particular from FIG. 4, the second locking unit 34 comprises a first, a second and a third bar 44, 46, 48. The bars 44, 46, 48 of the second locking unit 34, like the bars 36, 38 of the first locking unit 32, are connected to one another by means of a coupling device, which comprises a rod 50 that carries the bars 44, 46, 48. The rod 50 of the coupling device is in turn mounted rotatably in bearings made of a plastics material. A pivoting of the first bar 44 of the second locking unit 34 from an unlocking position shown in FIGS. 2 to 4 into a locking position represented in FIG. 5 is transmitted by the rod 50 of the coupling device to the second and the third bar 46, 48 of the second locking unit 34. Equally, a pivoting of the first bar 44 of the second locking unit 34 from its locking position into its unlocking position is transmitted by the rod 50 of the coupling device to the second and the third bar 46, 48 of the second locking unit 34. A pivoting of the first bar 44 of the second locking unit 34 from its unlocking position into its locking position or from its locking position into its unlocking position therefore automatically has the effect that the second and the third bar 46, 48 of the second locking unit 34 are correspondingly pivoted from their unlocking position into their locking position or from their locking position into their unlocking position.

With the aid of the bars 44, 46, 48 of the second locking unit 34 three boxes 14 disposed one behind the other in the compartment 12 of the aircraft galley may be secured against movement in the compartment 12 of the aircraft galley in a direction parallel to the longitudinal axis L of the compartment 12 of the aircraft galley. It is of course equally possible with the aid of the second locking unit 34 to fix one box 14 or two boxes 14, which take up approximately one third of the depth of the compartment 12 of the aircraft galley, in the compartment 12 of the aircraft galley. One box 14 may then, if need be, be disposed in a rear, a middle or a front region of the compartment 12 and be fixed by means of the third bar 48, the second and the third bar 46, 48 or the first and the second bar 44, 46. Two boxes 14 may be fixed by means of the bars 44, 46, 48 of the second locking unit 34 either in a rear or a front region of the compartment 12. Alternatively, two boxes 14 may be disposed in such a way that a middle region of the compartment 12 remains unoccupied.

The bars 36, 38 of the first locking unit 32 are disposed in corresponding housings 54, 56 that accommodate the bars 36, 38. In a similar manner the bars 44, 46, 48 of the second locking unit 34 are accommodated in corresponding housings 58, 60, 62. The housing 54 for accommodating the first bar 36 of the first locking unit 32 is in this case formed integrally with a housing for accommodating a first bar 44a of a second locking unit 34a of an adjacent mounting system. In a similar manner the housing 58 for accommodating the first bar 44 of the second locking unit 34 is formed integrally with a housing for accommodating a first bar 36a of a first locking unit 32a of an adjacent mounting system.

As already mentioned, the bars 36, 38 of the first locking unit 32 and the bars 44, 46, 48 of the second locking unit 34 may be pivoted about a longitudinal axis of the rods 40, 50 carrying the bars 36, 38, 44, 46, 48. It is however moreover also possible for the rod 40 of the first locking unit 32 and the rod 50 of the second locking unit 34 having the bars 36, 38, 44, 46, 48 fastened thereon to be displaced linearly along the longitudinal axes of the rods 40, 50. This is represented in FIGS. 2 to 5 by the arrows $P_1$ and $P_2$. In each of the housings 54 to 62 that accommodate the bars 36, 38, 44, 46, 48 of the first and the second locking unit 32, 34 a blocking projection 64 is disposed. In dependence upon the position of the bars 36, 38, 44, 46, 48 this blocking projection 64 may interact with a corresponding recess 66 formed in the bars 36, 38, 44, 46, 48.

In FIG. 2 the first locking unit 32 is in a first position, in which the recesses 66 formed in the bars 36, 38 of the first locking unit 32 are disposed directly above the blocking projections 64 formed in the housings 54, 56. Thus, in the first position of the first locking unit 32 the bars 34, 36 may be moved from their unlocking position shown in FIG. 2 into a locking position. In contrast thereto, the second locking unit 34 in the operating state of the mounting system 10 shown in FIG. 2 is in a second position, in which the recesses 66 formed in the bars 44, 46, 48 are disposed offset relative to the blocking projections 64 provided in the housings 58, 60, 62. The blocking projections 64 therefore prevent a movement of the bars 44, 46, 48 of the second locking unit 34 from their unlocking position into their locking position.

The first and the second locking unit 32, 34 and/or the rods 40, 50 of the coupling devices of the first and the second locking unit 32, 34 are connected to one another by a transmission 68. The transmission 68 comprises a lever 70, which is pivotable about a centre line A and is connected at a first end to the rod 40 of the coupling device of the first locking device 32. A second, opposite end of the lever to the first end of the lever 70, on the other hand, is connected to the rod 50 of the coupling device of the second locking unit 34. A linear movement of the first locking unit 32 in a direction along the longitudinal axis of the rod 40 is therefore converted by the transmission 68 into a linear movement of the second locking unit 34 along the longitudinal axis of the rod 50 in a second, opposite direction to the first direction. In a similar manner the transmission 68 converts a linear movement of the second locking unit 34 along the longitudinal axis of the rod 50 in a first direction into a movement of the first locking unit 32 along the longitudinal axis of the rod 40 in a second, opposite direction to the first direction.

In contrast to the operating state shown in FIG. 2, in the operating state of the mounting system 10 represented in FIG. 3 the second locking unit 34 is in its first position, in which as a result of an interaction of the blocking projections 64 formed in the housings 58, 60, 62 with the recesses 66 provided in the bars 44, 46, 48 a pivoting of the bars 44, 46, 48 from their unlocking position into their locking position is possible. By means of the transmission 68 the linear movement of the second locking unit 34 along the longitudinal axis of the rod 50 in a direction away from the transmission 68 has been converted into a linear movement of the first locking unit 32 along the longitudinal axis of the rod 50 in the direction of the transmission 68. As a result, the bars 36, 38 of the first locking unit 32 have been offset in such a way relative to the housings 54, 56 accommodating the bars that the recesses 66 formed in the bars 36, 38 are no longer situated above the blocking projections 64. It is therefore no longer possible for the bars 36, 38 of the first locking unit 32 to pivot from their unlocking position into their locking position. Instead, a pivoting movement of the bars 36, 38 is blocked by the blocking projections 64. FIG. 5 finally shows the bars 44, 46, 48 of the second locking unit 34 in their locking position.

The mounting system 10 further comprises a detection device 72, which is diagrammatically represented in FIG. 7. The detection device 72 by interacting with a mark provided on the box 14 is capable of detecting the size of the box 14 accommodated in the compartment 12 of the aircraft galley. If the detection device 72 detects that one box 14 or two boxes 14 that take(s) up approximately half the depth of the compartment 12 of the aircraft galley is/are accommodated in the compartment 12 of the aircraft galley, an actuating device 74 ensures that the first locking unit 32 is moved into its first position shown in FIG. 2, in which a pivoting of the bars 36, 38 of the first locking unit 32 into their locking position is possible. At the same time, with the aid of the transmission 68 the second locking unit 34 is moved into its second position, in which the bars 44, 46, 48 of the second locking unit 34 are blocked in their unlocking position. The bars 36, 38 of the first locking unit 32 may then be moved manually into their locking position.

If, on the other hand, the detection device 72 detects that one box 14 or a plurality of boxes 14 that take up approximately one third of the depth of the compartment 12 are disposed in the compartment 12 of the aircraft galley, the actuating device 74 moves the second locking unit 34 into its first position represented in FIGS. 3 and 4, in which the bars 44, 46, 48 of the second locking unit 34 may be pivoted from their unlocking position into their locking position. In this case, by means of the transmission 68 the first locking unit 32 is moved into its second position, in which the bars 36, 38 of the first locking unit 32 are blocked against pivoting from their unlocking position into their locking position. The bars 44, 46, 48 of the second locking unit 34 may then be moved manually into their locking position.

Finally the mounting system 10 comprises an unloading device 76, which comprises An actuating handle 78 as well as a slider 80, which is connected to the actuating handle 78 and displaceable parallel to the longitudinal axis L of the compartment 12 of the aircraft galley. The slider 80 is used to interact with a rear wall of a box 14 accommodated in the compartment 12 of the aircraft galley in order upon a manual actuation of the actuating handle 78, i.e. when the handle 78 is moved in the direction of the arrow $P_3$, to interact with a rear wall of a box 14 accommodated in the compartment 12 of the aircraft galley. The slider 80 therefore slides the box 14 out of the compartment 12 of the aircraft galley. To counteract an unintentional actuation of the actuating handle 78, the actuating handle 78 is preloaded into its non-actuated position shown in FIGS. 2 to 5 by means of a spring that is not shown in the figures. The equipping of a mounting system 10 with an unloading device 76 is advantageous particularly if the compartment 12 is situated in a poorly accessible, for example upper region of the aircraft galley.

The invention claimed is:

1. A mounting system for attaching a box in a compartment of an aircraft galley, comprising:
   a first guide device on the mounting system formed by an elongate rail extending in a longitudinal direction along a bottom of the compartment with recessed cavities formed on either side thereof,
   a second guide device connected along the bottom of the box having a pair of projections formed on either side thereof;
   wherein the projections and the recessed cavities are complementary in shape such that second guide device slidingly engages within the elongate rail of the first guide device when box is inserted into or removed from the compartment of the aircraft galley;
   wherein engagement of the first and second guide devices permits movement of the box only along the longitudinal direction within the compartment of the aircraft galley;
   a locking mechanism for selectively securing the box against movement in the compartment of the aircraft galley in the longitudinal direction; and
   an unloading device having an actuating handle and a slider connected to the actuating handle being displaceable parallel to the longitudinal direction in the compartment of the aircraft galley, wherein the slider is constructed with a portion to engage with a rear wall of the box to slide the box out of the compartment of the aircraft galley and the first and second guide devices are no longer engaged when the unloading device is actuated.

2. Mounting system according to claim 1, characterized in that the first guide device is disposed on a carrier element, which is devised to support a base element of the box when the first guide device is in engagement with the complementary second guide device formed on the box.

3. Mounting system according to claim 1, characterized in that the first guide device and the complementary second guide device formed on the box form a dovetail joint.

4. Mounting system according to claim 1, characterized in that the locking mechanism comprises a first locking unit having a first number of bars, wherein the bars of the first locking unit are devised in a locking position to secure a number, corresponding to the first number of bars, of boxes accommodated one behind the other in the compartment of the aircraft galley against movement in the compartment of the aircraft galley in a direction parallel to the longitudinal axis of the compartment of the aircraft galley.

5. Mounting system according to claim 4, characterized in that the first locking unit comprises a coupling device, which couples the bars of the first locking unit in such a way to one another that upon a movement of a first bar into a locking position the remaining bars are likewise moved into a locking position and that upon a movement of the first bar into an unlocking position the remaining bars are likewise moved into an unlocking position.

6. Mounting system according to claim 4, characterized in that the first and/or the second locking unit comprises/comprise a blocking mechanism and is/are movable between a first and a second position, wherein the blocking mechanism in the first position of the first and/or the second locking unit enables a movement of a bar of the first and/or the second locking unit into a locking position and in the second position of the first and/or the second locking unit blocks a movement of the bar of the first and/or the second locking unit into a locking position.

7. Mounting system according to claim 6, characterized in that the blocking mechanism of the first locking unit comprises at least one blocking projection, which in the second position of the first locking unit interacts in such a way with a bar of the first locking unit that a movement of the bar into a locking position is blocked and which in the first position of the first locking unit upon a movement of the bar into a locking position is received in a recess that is formed in the bar.

8. Mounting system according to claim 6, characterized in that the blocking mechanism of the second locking unit comprises at least one blocking projection, which in the second position of the second locking unit interacts in such a way with a bar of the second locking unit that a movement of the bar into a locking position is blocked and which in the first position of the second locking unit upon a movement of the bar into a locking position is received in a recess that is formed in the bar.

9. Mounting system according to claim 6, characterized in that the first and the second locking unit are connected to one another by a transmission, which is devised to move the second locking unit into its second position, in which the blocking mechanism of the second locking unit blocks a movement of a bar of the second locking unit into a locking position, when the first locking unit is moved into its first position, in which the blocking mechanism of the first locking unit enables a movement of a bar of the first locking unit into a locking position, and which is further devised to move the first locking unit into its second position, in which the blocking mechanism of the first locking unit blocks a movement of a bar of the first locking unit into a locking position, when the second locking unit is moved into its first position, in which the blocking mechanism of the second locking unit enables a movement of a bar of the second locking unit into a locking position.

10. Mounting system according to claim 9, characterized in that the transmission comprises a lever, which is pivotable about a centre line and is connected at a first end to the first locking unit and at a second end to the second locking unit, so that a linear movement of the first locking unit in a first direction is converted by the lever into a movement of the second locking unit in a second, opposite direction to the first direction.

11. Mounting system according to claim 6, characterized in that the mounting system further comprises a detection device for detecting the size of a box accommodated in the compartment of the aircraft galley as well as an actuating device, wherein the actuating device is devised in dependence upon the size, detected by the detection device, of the box accommodated in the compartment of the aircraft galley to move either the first or the second locking unit into its first position, in which the blocking mechanism of the first or the second locking unit enables a movement of a bar of the first and/or the second locking unit into a locking position.

12. Mounting system according to claim 1, characterized in that the locking mechanism comprises a second locking unit having a second number of bars, wherein the bars of the second locking unit are devised in a locking position to secure a number, corresponding to the second number of bars, of boxes accommodated one behind the other in the compartment of the air-craft galley against movement in the compartment of the aircraft galley in a direction parallel to the longitudinal axis of the compartment of the aircraft galley.

13. Mounting system according to claim 12, characterized in that the second locking unit comprises a coupling device, which couples the bars of the locking unit in such a way to one another than upon a movement of a first bar into a locking position the remaining bars are likewise moved into a locking position and that upon a movement of the first bar into an unlocking position the remaining bars are likewise moved into an unlocking position.

14. Aircraft galley comprising:
a basic body, in which at least one compartment for receiving a box is formed, and
a mounting system according to claim 1.

* * * * *